United States Patent [19]

Heitmann

[11] Patent Number: 4,736,911
[45] Date of Patent: Apr. 12, 1988

[54] AIRPLANE PASSENGER SEAT WITH FLAME-RETARDING CONSTRUCTION

[75] Inventor: Ulrich Heitmann, Memmingen, Fed. Rep. of Germany

[73] Assignee: Metzeler Schaum GmbH, Memmingen, Fed. Rep. of Germany

[21] Appl. No.: 834,914

[22] Filed: Feb. 28, 1986

[30] Foreign Application Priority Data

Feb. 28, 1985 [DE] Fed. Rep. of Germany ....... 3507085

[51] Int. Cl.$^4$ ............................................. B64D 11/06
[52] U.S. Cl. ........................... 244/122 R; 297/DIG. 5; 5/459; 428/921; 521/906
[58] Field of Search ............. 244/122 R; 297/DIG. 5; 5/459, 481; 428/921, 920; 521/906

[56] References Cited

U.S. PATENT DOCUMENTS

| | | | |
|---|---|---|---|
| 3,647,609 | 3/1972 | Cyba | 5/459 |
| 3,909,464 | 9/1975 | Anorga et al. | 521/906 |
| 4,018,724 | 4/1977 | Cobbledick | 521/906 |
| 4,060,280 | 11/1977 | Van Loo | 297/DIG. 5 |
| 4,092,752 | 6/1978 | Dougar | 5/459 |
| 4,147,678 | 4/1979 | Mao et al. | 521/906 |
| 4,254,177 | 3/1981 | Fulmer | 5/459 |
| 4,294,489 | 10/1981 | Anolick et al. | 297/DIG. 5 |
| 4,349,494 | 9/1982 | Fulmer | 521/906 |
| 4,439,472 | 3/1984 | Bell | 297/DIG. 5 |
| 4,603,078 | 7/1986 | Zanker et al. | 521/906 |

FOREIGN PATENT DOCUMENTS 2137492  10/1984  United Kingdom ......... 297/DIG. 5

Primary Examiner—Sherman D. Basinger
Assistant Examiner—L. M. Fiorito
Attorney, Agent, or Firm—Herbert L. Lerner; Laurence A. Greenberg

[57] ABSTRACT

An airline passenger seat with flame-retarding properties with seat and back-rest upholstery consisting of polyurethane foam which is provided with a flame-retarding surface and is covered by a covering material with flame-retarding properties. A polyurethane foam film is arranged between the seat and back-rest upholstery and the covering material, at least on the surface not covered by the seat frame parts, and the surface of the film is connected to the upholstery.

4 Claims, 1 Drawing Sheet 4,736,911

AIRPLANE PASSENGER SEAT WITH FLAME-RETARDING CONSTRUCTION

BACKGROUND OF THE INVENTION

1. Field of the Invention

This invention relates to an airline passenger seat of flame-retarding construction with seat and back-rest upholstery formed of polyurethane foam, which is provided with a flame-retarding surface and is covered by a covering material with flame-retarding properties.

2. Description of the Prior Art

According to the most recent specifications of the U.S. flight authorities FAA (Federal Aviation Administration), more stringent tests on the interior fittings of airplanes have been prescribed as a result of findings from airplane accidents, so as to increase the available rescue time in a post-crash or inflight fire by from 40 to 60 seconds. Achievement of this protective measure is to be determined by subjecting the airline seat having foam upholstery to an oil burner flame at 1010° C. for 2 minutes during testing, corresponding to a radiation intensity of 11.5 W/cm$^2$ on the surface.

The weight loss of the seat upholstery after this test should then be at most 10%, without further smouldering or dropping of molten foam masses occurring. In order to meet this specification, it has thus far been customary to cover the upholstery foam solely with a non-flammable covering material or an interliner of glass fibre woven material or to sew the foam upholstery therein. Such a flame-retarding finish, however involves substantial costs and furthermore causes comfort of the passenger to be impaired since the air permeability is substantially reduced. Furthermore, the cleaning of dirty covers which are treated in this manner is inadequate and unsatisfactory.

SUMMARY OF THE INVENTION

An object of the present invention is to provide an airline passenger seat with flame-retarding properties in which the foam upholstery itself satisfies the strict demands of flame-resistance, without comfort thereby being sacrificed in relation to conventional seats, and without an increase in weight or premature wear.

With the foregoing and other objects in view, there is provided in accordance with the invention an airline passenger seat with flame-retarding properties having a seat frame and with seat and back-rest upholstery of polyurethane foam which is covered by a covering material with flame-retarding properties in combination with polyurethane foam film with flame-retarding properties arranged between the seat and back-rest upholstery and the covering material, at least on the surface not covered by the seat frame, with the surface of the foam film connected to the upholstery.

Other features which are considered as characteristic for the invention are set forth in the appended claims.

Although the invention is illustrated and described herein as embodied in an airline passenger seat in a flame-retarding design, it is nevertheless not intended to be limited to the details shown, since various modifications may be made therein without departing from the spirit of the invention and within the scope and range of equivalents of the claims.

BRIEF DESCRIPTION OF THE DRAWINGS

The invention however, together with additional objects and advantages thereof will be best understood from the following description when read in connection with the accompanying drawings in which.

DESCRIPTION OF THE PREFERRED EMBODIMENTS

This object of providing an airline passenger seat with flame retarding properties in which the foam upholstery itself satisfies the strict demands of flame-resistance, is achieved according to the invention in that a polyurethane foam film with flame-retarding properties is arranged between the seat and back-rest upholstery on the one hand and the covering material on the other hand, at least on the surfaces not covered by the seat frame parts, the entire surface of which film is firmly connected to the actual foam upholstery.

A suitable thickness of the foam film is from 5 to 30 mm, preferably from 10 to 25 mm. The entire surface of the foam film can thereby be bonded to the upholstery by means of a known flame-resistant adhesive. The foam film may be inserted directly in foam form, by foaming onto the upholstery foam.

Immersion in aluminum hydroxide contained in chloroprene latex binder, and antimony trioxide is particularly suitable for equipping the foam film with flame-resistant properties. The immersion is from 350 to 450% by weight, based on the crude weight of the untreated foam film.

Such an airline passenger seat can be produced simply and its flame-resistance is substantially within the minimum requirements in the corresponding specifications.

The constructions of such an airline passenger seat with flame-retarding properties according to the invention is illustrated in more detail by the schematic drawings.

Figure 1:
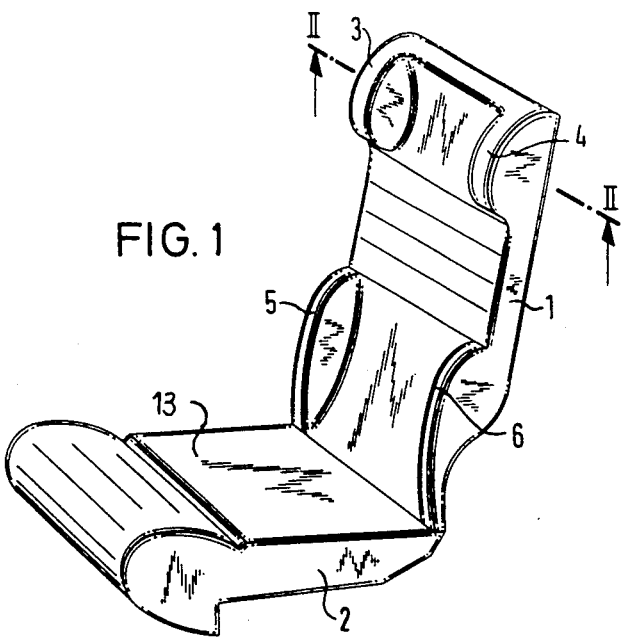
FIG. 1 shows a perspective view of seat and back-rest upholstery for an airline passenger seat.

As can be seen in FIG. 1, the upholstery of a conventional airline passenger seat consists of back-rest upholstery 1 and seat upholstery 2 which is conventionally produced from a polyurethane polyether foam. These parts can thereby be cut from a block or directly foamed in a form as cold or hot foam. Form foaming is particularly recommended for the back-rest upholstery 1, since this has a relatively fissured surface with the two side head supports 3 and 4 and the two lower side guides 5 and 6.

Figure 2:
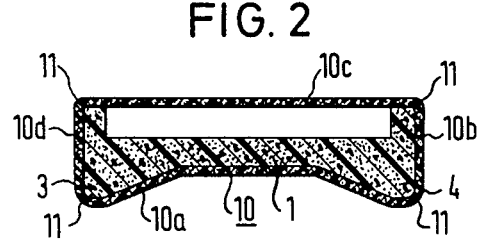
FIG. 2 shows a cross-section through the head section of the back-rest upholstery, taken along line II-II of FIG. 1.

The surfaces which can be seen in the passenger seat of FIG. 1, as well as the rear side surfaces, have a covering material 13 with flame-retarding properties disposed thereon, but are generally not covered by the actual seat frame parts and must therefore have special flame-retarding properties. This takes place, as can be seen in the sections according to FIGS. 2 and 3 in which the covering material has been omitted, by covering with a polyurethane foam film with flame-retarding properties. According to FIG. 2, which shows a cross-section through the head section of the back-rest upholstery 1, along line II—II of FIG. 1, the side headrests 3 and 4 of the head section 1 are entirely covered with a foam film 10, which is flame-retarding in a manner described below. This film 10 can be bonded in 4 film sections 10a, b, c and d corresponding to the exposed sides, onto the actual foam cushion 1 by means of an adhesive with flame-retarding properties. The borders 11 in film strips 10a to 10d are likewise bonded with this adhesive.

Figure 3:
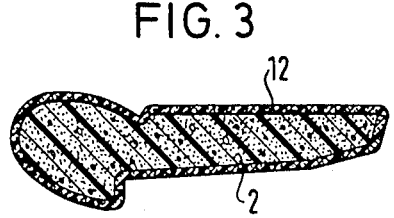
FIG. 3 shows a longitudinal section through the seat upholstery.

In the same manner, the seat cushion 2, corresponding to the longitudinal section through this upholstery according to FIG. 3, is bonded on all sides with a foam film 12 with flame-retarding properties. A polyether polyurethane foam with a volume weight of about 16 kg/m$^3$ is suitably used for this foam film with flame-retarding properties. This foam film is saturated with a flame-retarding compound of, for example, from 60 to 70% of aluminum hydroxide, from 2 to 3% of antimony trioxide as well as from 30 to 40% by weight of chloroprene latex as binder and the conventional stabilizers.

A film with such flame-retarding properties is then bonded onto the actual foam upholstery. The film has a thickness of about 10 mm, although a thicker film can be used on areas which may be subject to a greater risk.

Instead of bonding this foam film with flame-retarding properties onto the foam upholstery, the film may be introduced directly in foam form and foamed at the rear with the actual upholstery material.

A seat and back cushion with such properties was exposed to radiation for 2 minutes according to the test described at the outset, from a distance of 102 mm with a kerosene flame of 1035° C., corresponding to a radiation intensity of 11.5 W/cm$^2$. The subsequently measured weight loss was only 2% and is thus substantially lower than the permissible weight loss of 10%. The fire only spread in an area directly exposed to flames without showing further smouldering or dropping of molten foam masses. It was revealed that the foam film with flame-retarding properties was completely carbonized in the area exposed to flames and thus formed an optimum thermal insulating layer such that the actual interior foam upholstery was completely protected.

Further tests have shown that seat upholstery with such properties to no extent sacrifices comfort and has the necessary air permeability in relation to conventional upholstery.

The foregoing is a description corresponding, in substance, to German application No. P 35 07 085.4, dated Feb. 28, 1985, international priority of which is being claimed for the instant application and which is hereby made part of this application. Any material discrepancies between the foregoing specification and the specification of the aforementioned corresponding German application are to be resolved in favor of the latter.

There is claimed:

1. In an airline passenger seat with flame-retarding properties having a seat frame, the improvement compising a seat and back-rest upholstery core of polyurethane foam partly covered by the seat frame, a covering material with flame-retarding properties covering the seat and back-rest upholstery core, and a polyurethane foam film with flame-retarding properties being arranged between the seat and back-rest upholstery core and the covering material and adhesively bonded to the seat and back-rest upholstery core, the flame-retarding properties of the polyurethane foam film being provided by an impregnation of aluminum hydroxide in a chloroprene latex binder and antimony trioxide, the polyurethane foam film having a thickness of substantially between 10 and 25 mm.

2. An airline passenger seat according to claim 1, wherein the foam film is bonded to the upholstery core by means of an adhesive with flame-retarding properties.

3. An air passenger seat according to claim 1, wherein the impregnation is from 350 to 450% by weight, based on the crude weight of the untreated foam film.

4. An airline passenger seat according to claim 1, wherein the polyurethane foam film contains 60 to 70% by weight of aluminum hydroxide, 2 to 3% by weight of antimony trioxide and 30 tp 40% by weight of chloroprene latex binder.

* * * * *